United States Patent
Bucher et al.

(10) Patent No.: US 11,614,029 B2
(45) Date of Patent: Mar. 28, 2023

(54) METHOD FOR THE UTILIZATION OF WASTE HEAT OF A HEAT ENGINE

(71) Applicant: Mahle International GmbH, Stuttgart (DE)

(72) Inventors: Michael Bucher, Berlin (DE); Michael Hoetger, Berlin (DE); Jana Mertens, Berlin (DE); Harald Scherg-Kurmes, Berlin (DE); Gerd Wieczorek, Berlin (DE)

(73) Assignee: Mahle International GmbH

( * ) Notice: Subject to any disclaimer, the term of this patent is extended or adjusted under 35 U.S.C. 154(b) by 80 days.

(21) Appl. No.: 17/089,693

(22) Filed: Nov. 4, 2020

(65) Prior Publication Data

US 2021/0131342 A1 May 6, 2021

(30) Foreign Application Priority Data

Nov. 5, 2019 (DE) .......................... 102019217031.5

(51) Int. Cl.
*F02G 5/02* (2006.01)
*F02B 37/12* (2006.01)

(52) U.S. Cl.
CPC ................ *F02B 37/12* (2013.01); *F02G 5/02* (2013.01)

(58) Field of Classification Search
CPC . F02B 37/12; F02G 5/02; Y02T 10/12; F01K 23/065; F01K 23/10; F01N 5/02
See application file for complete search history.

(56) References Cited

U.S. PATENT DOCUMENTS

| 8,572,964 B2 | 11/2013 | Gartner et al. |
| 2013/0056992 A1* | 3/2013 | Wada ................... F01K 23/065 290/1 A |
| 2019/0093537 A1* | 3/2019 | Grelet ...................... F01P 3/12 |

FOREIGN PATENT DOCUMENTS

| DE | 102006043491 A1 | 3/2008 |
| DE | 102008012907 A1 | 9/2009 |
| DE | 102010063701 A1 | 6/2012 |
| DE | 102011003607 A1 | 8/2012 |
| DE | 102016007186 A1 | 12/2017 |
| DE | 102017102893 A1 | 8/2018 |

OTHER PUBLICATIONS

English abstract for DE-102006043491.
English abstract for DE-102010063701.
English abstract for DE-102011003607.
English abstract for DE-102016007186.
English abstract for DE-102017102893.

* cited by examiner

*Primary Examiner* — Audrey B. Walter
*Assistant Examiner* — Edward Bushard
(74) *Attorney, Agent, or Firm* — Fishman Stewart PLLC

(57) ABSTRACT

A method for operating a heat recovery system for the utilization of waste heat of a heat engine of the heat recovery system may include discharging a carrier fluid via the heat engine, feeding the carrier fluid to an evaporator of a cyclic process of the heat recovery system, vaporizing a working fluid of the cyclic process via the evaporator and the waste heat, feeding the working fluid to an expansion engine of the cyclic process after vaporizing the working fluid, determining at least one carrier state variable of the carrier fluid at the evaporator, and setting at least one operating parameter of the heat recovery system based on the at least one determined carrier state variable.

20 Claims, 1 Drawing Sheet

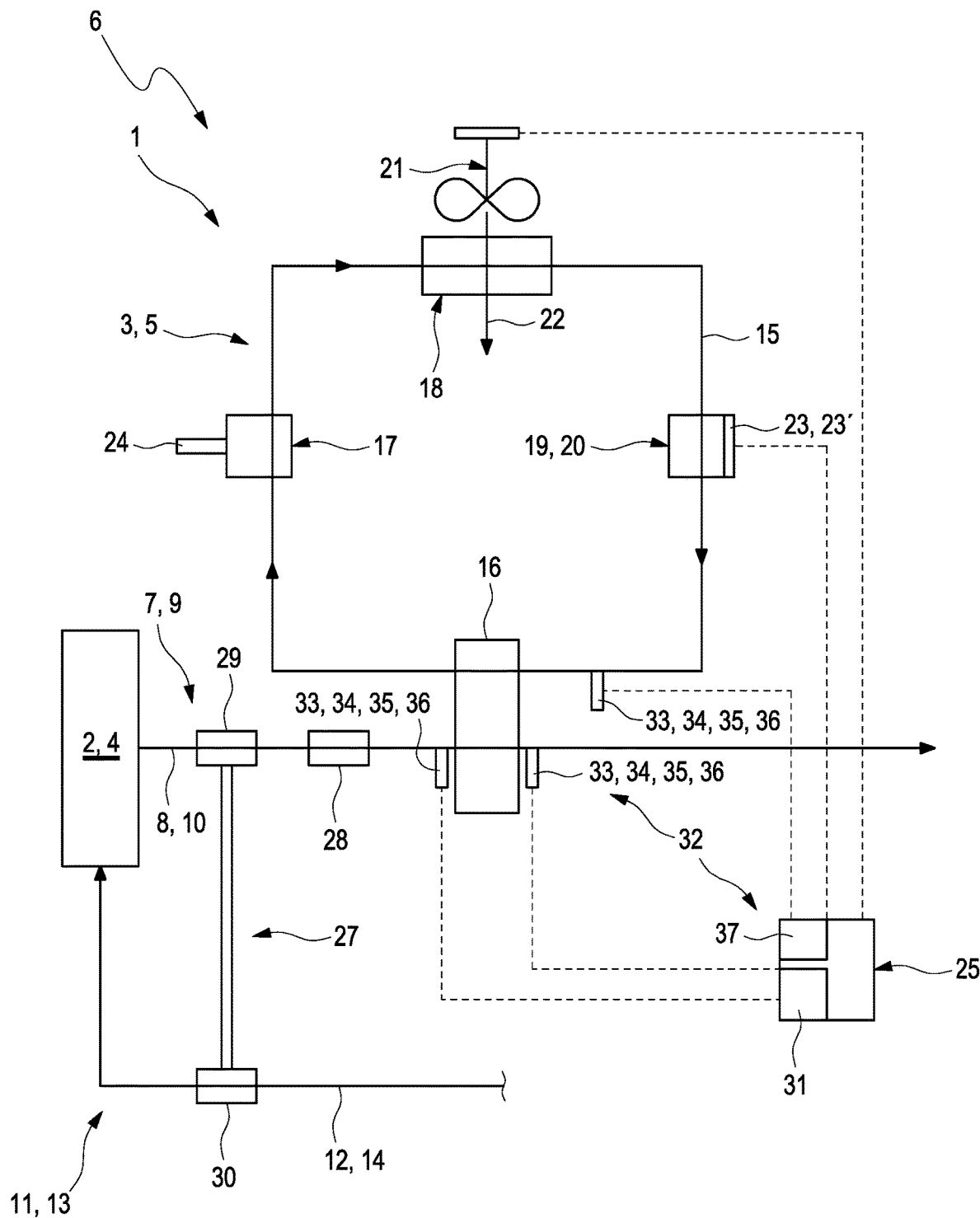

METHOD FOR THE UTILIZATION OF WASTE HEAT OF A HEAT ENGINE

CROSS-REFERENCE TO RELATED APPLICATIONS

This application claims priority to German Patent Application No. DE 10 2019 217 031.5, filed on Nov. 5, 2019, the contents of which is hereby incorporated by reference in its entirety.

TECHNICAL FIELD

The present invention relates to a method for the utilization of waste heat of a heat engine discharging a carrier fluid. The invention relates furthermore to a heat recovery system for the utilization of waste heat of a heat engine.

BACKGROUND

Heat engines generate waste heat during operation, which is usually emitted to the environment without further use. It is therefore useful to utilize the waste heat of such heat engines.

During operation of such heat engines, a fluid occurs therewith, which is discharged at raised temperatures. In the case of heat engine configured as an internal combustion engine, hot waste gas occurs for example. This fluid, hereinafter also designated as carrier fluid, can be used for the utilization of the waste heat of the heat engine. For this purpose, it is known to use the carrier fluid for the vaporizing of a working fluid in a cyclic process. For this, usually an evaporator is used which is integrated in the cyclic process.

From DE 10 2006 043 491 A1 a vapour cycle is known, in which the pressure or the temperature is detected at a condenser and a pump is set, dependent hereon, so that the performance of an expander is maximal. In so doing, temperature fluctuations at the condenser, dependent on the season and on the time of day, are utilized in such a way that a cooling performance is optimized.

From DE 10 2010 063 701 A1 a method is known for the utilization of waste heat of a heat engine, wherein the waste heat of the heat engine is transferred via an evaporator to a working fluid in a cyclic process, in which an expansion engine is integrated. For different operating states of the heat engine, optimum pressure values and temperature values of the working fluid are stored, which lead to a maximizing of the performance of the expansion engine. In operation, the pressure and the temperature of the working fluid are set in such a way that the expansion engine delivers a maximum performance.

SUMMARY

The present invention is concerned with the problem of indicating improved or at least different embodiments for a method for the utilization of waste heat of a heat engine in a heat recovery system and for such a heat recovery system for the utilization of the waste heat of a heat engine, which are distinguished in particular by an increased efficiency and/or an improved reliability.

This problem is solved according to the invention by the subject matter of the independent claim(s). Advantageous embodiments are the subject matter of the dependent claim(s).

The present invention is based on the general idea of using a cyclic process for the utilization of waste heat of a heat engine in a heat recovery system, to which cyclic process the waste heat is transferred, and to set the operation of the heat recovery system, in particular of the cyclic process, depending on an interface at which the waste heat of the heat engine is transferred to the cyclic process. Therefore, errors and/or distortions of the heat actually transferred to the cyclic process can be prevented or at least reduced. As a result, losses of efficiency of the utilization of the waste heat due to such distortions are prevented or at least reduced. In addition, hereby a more reliable operation of the heat recovery system, in particular of the cyclic process, results, and consequently a more reliable utilization of the waste heat of the heat engine. The transfer of the waste heat of the heat engine takes place here by a fluid which the heat engine discharges in operation, and which is also designated hereinafter as carrier fluid.

In accordance with the idea of the invention, in the method for the utilization of the waste heat of the heat engine the carrier fluid is fed to an evaporator of the cyclic process, wherein the evaporator transfers heat from the carrier fluid to a working fluid of the cyclic process, in particular vaporizes the working fluid. The working fluid subsequently flows to an expansion engine, which converts the thus obtained energy of the working fluid and provides it for further use. According to the invention, in operation at least one state variable of the carrier fluid is determined at the evaporator and at least one operating parameter of the heat recovery system comprising the heat engine and the cyclic process, in particular at least one operating parameter of the cyclic process, is set depending on the at least one determined state variable of the carrier fluid at the evaporator.

The cyclic process comprises expediently a circuit, in which the working fluid circulates in operation. Here, advantageously the evaporator and the expansion engine are integrated in the circuit. Advantageously, in addition a conveying device for conveying the working fluid through the circuit, in particular a pump, and/or a condenser for condensing the circuit, are integrated in the circuit.

The setting of the at least one operating parameter of the heat recovery system takes place in particular in the manner of a pre-control. It is also conceivable to carry out a readjustment of the at least one operating parameter of the heat recovery system depending on the at the at least one determined state variable of the carrier fluid at the evaporator.

Basically, in operation any desired operating parameters of the heat recovery system can be set depending on the at least one determined state variable of the carrier fluid at the evaporator.

The heat recovery system can have, for example, a charging device, in particular a turbocharger, for compressing a fluid which is to be fed to the heat engine. Here, a mass flow of the carrier fluid through the turbocharger can be set as an operating parameter depending on the at least one determined state variable of the carrier fluid at the evaporator. Alternatively or additionally, a performance of the turbocharger, in particular in the case of an at least partially electrically driven turbocharger, can be set as operating parameter depending on the at least one determined state variable of the carrier fluid at the evaporator.

The heat recovery system can have an aftertreatment device for the aftertreatment of the carrier fluid, in particular for reducing harmful substances in the carrier fluid. Here, a mass flow of the carrier fluid through the aftertreatment device can be set as operating parameter depending on the at least one determined state variable of the carrier fluid at the evaporator.

In an associated application of the heat recovery system, for example in a motor vehicle, from the application to the heat engine, an in particular changing, tappable output, for example a tappable torque, can be predetermined. It is preferred here if the at least one operating parameter, which is set depending on the at least one determined state variable of the carrier fluid at the evaporator, is set taking into consideration the predetermined performance of the heat engine, expediently in such a way that the heat engine provides the predetermined output.

The operating parameters of the cyclic process include in particular the pressure and/or the temperature of the working fluid in the circuit. Accordingly, in operation the temperature and/or the pressure of the working fluid can be set depending on the at least one determined state variable of the carrier fluid at the evaporator. For this purpose, the performance of the conveying device and/or of the condenser can be set accordingly. For example, for this purpose a cooling performance of the condenser or, in particular in the case of an, indirect condenser, the performance of a cooler or cooling circuit cooling the condenser, can be set.

In preferred embodiments, for at least one state variable of the carrier fluid at the evaporator for at least one of the at least one operating parameters an optimum value is predetermined and stored. Here, in operation, this optimum value, subsequently also designated optimum operating parameter, is set when the state variable of the carrier fluid, associated with the optimum operating parameter, is determined at the evaporator. This means that in operation at least one of the at least one operating parameters is set to the optimum operating parameter associated with the predetermined state variable of the carrier fluid at the evaporator.

Embodiments are particularly preferred, in which the at least one optimum operating parameter is determined, stored and set in such a way that the overall efficiency of the heat recovery system is maximized. The predetermining of the optimum operating parameters and the setting of the operating parameters in determining the associated state variable of the carrier fluid at the evaporator therefore does not take place in such a way that the performance and/or the efficiency of individual components of the heat recovery system, in particular of the cyclic process, for example of the expansion engine, is maximized, but rather that the overall efficiency, in particular the overall energy balance, of the heat recovery system is maximized. Here, the knowledge is utilized that the maximizing of the performance of individual components, in particular of the expansion engine, can result in an additional energy consumption of other components of the heat recovery system, in particular of the cyclic process, which can reduce the overall efficiency of the heat recovery system and therefore can lead to a reduced overall energy balance. A maximizing of the performance of the expansion engine can promote for example an increased performance of the condenser and therefore an increased cooling of the working fluid in the cyclic process, which can increase the energy consumption of the condenser and therefore can lead to the fact that the increased energy consumption of the condenser, caused by the maximizing of the performance of the expansion engine, leads to no or even a reduction of the overall efficiency of the heat recovery system, in particular of the cyclic process. This is therefore counteracted by the overall efficiency of the cyclic process being considered and maximized. Likewise, a reduction of the efficiency of the cyclic process can lead to more thermal energy being transferred to the working fluid via the evaporator, and the overall efficiency of the heat recovery system being maximized despite reduction of the efficiency of the cyclic process. Accordingly, in the maximizing of the overall efficiency in particular the overall energy consumption and the energy gain of the entire heat recovery system are taken into consideration.

In the maximizing of the overall efficiency, in particular an energy consumption of the conveying device and/or a cooling performance of the condenser of the cyclic process are taken into consideration here.

It is also conceivable, in the maximizing of the overall efficiency, to take into consideration the efficiency of the expansion engine. If, for example, electric current is generated with the expansion engine, the efficiency of the expansion engine for generating the current can be taken into consideration. If the expansion engine is connected with a drive train for driving the associated application, for example the motor vehicle, in such a way that the expansion engine contributes to the drive, the efficiency of the drive train can be taken into consideration. Here, also the heat engine can drive the associated application via the drive train.

Basically, for setting the at least one operating parameter, any desired state variable of the carrier fluid at the evaporator can be used. Interior state variables of the carrier fluid at the carrier are preferably used here.

It is conceivable to use as a state variable of the carrier fluid at the evaporator the temperature of the carrier fluid at the evaporator. Here, both the temperature of the carrier fluid upstream of the evaporator and also downstream of the evaporator can be used.

When measuring devices, for example temperature sensors, are used for determining the temperature of the carrier fluid, it is preferred if these are used downstream of the evaporator. As the carrier fluid has reduced temperatures after flowing through the evaporator, in this way more cost-effective measuring devices can be used and/or the lifespan of the measuring device can be increased.

Alternatively or additionally, the pressure in the carrier fluid at the evaporator is used as state variable of the carrier fluid. It is possible here to use the pressure in the carrier fluid upstream and/or downstream of the evaporator. When the pressure both upstream and also downstream of the evaporator is used, it is hereby possible to also take into consideration a drop in pressure of the carrier fluid at the evaporator.

It is also conceivable alternatively or additionally to use a mass flow of the carrier fluid through the evaporator as state variable of the carrier fluid. Here, for determining the mass flow in operation, the pressure in the carrier fluid upstream and downstream of the evaporator can be taken into consideration.

Embodiments are advantageous in which in operation, for determining at least one of the state variables of the carrier fluid, at least one state variable of the working fluid in the cyclic process, hereinafter also designated as working state variable, is taken into consideration. This means that for determining at least one of the state variables of the carrier fluid, hereinafter also designated as carrier state variable, at least one working state variable of the working fluid in the cyclic process is taken into consideration.

Alternatively or additionally, it is conceivable, for determining at least one of the carrier state variables, to take into consideration at least one operating parameter of the heat recovery system. It is conceivable in particular, through taking into consideration the temperature and/or the pressure of the working fluid as working state variable, to determine an amount of heat in the evaporator and, depending thereon, to determine the mass flow and/or the temperature of the carrier fluid at the evaporator. In particular, this makes it possible to dispense with a direct determining of the carrier state variables at the evaporator. In particular, in this way a determining of the temperature of the carrier fluid upstream of the evaporator by means of a measuring device, for example a temperature sensor, can be dispensed with. This leads to a simple and cost-effective implementation of the utilization of the waste heat of the heat engine.

Embodiments are considered to be advantageous in which for determining at least one of the carrier state variables and/or for setting at least one of the operating parameters of the cyclic process, a stored model is used, in which at least one carrier state variable and/or at least one working state variable and/or at least one operating parameter and/or one flow section of the carrier fluid, in particular between the heat engine and the evaporator, are taken into consideration and represented. This means in particular that the determining of at least one carrier state variable takes place taking the model into consideration. In particular therefore the determining of the carrier state variable can take place indirectly taking into consideration the model.

The model can represent for example the flow section of the carrier fluid, in particular together with the heat engine. Therefore, for example, the mass flow of the carrier fluid can be determined via the drop in pressure of the carrier fluid at the evaporator.

In the model, further or alternatively, state variables of the carrier fluid at other components can be taken into consideration and represented. If, for example, a turbocharger is provided for compressing a fluid which is to be fed to the heat engine, the temperature and/or the mass flow of the carrier fluid at the evaporator can be determined through taking into consideration the temperature of the carrier fluid at the turbocharger and/or through taking into consideration the mass flow of the carrier fluid through the turbocharger. If an aftertreatment device is provided for the aftertreatment of the carrier fluid, in particular for reducing harmful substances in the carrier fluid, the temperature and/or the mass flow of the carrier fluid at the evaporator can be determined by taking into consideration the temperature of the carrier fluid at the aftertreatment device and/or by taking into consideration the mass flow of the carrier fluid through the aftertreatment device.

In the model, alternatively or additionally, thermal inertias, heat transfer coefficients and suchlike, in particular of the turbocharger and/or of the aftertreatment device and/or fluid lines directing the carrier fluid, can be taken into consideration.

Alternatively or additionally, in the model exterior state variables such as for example the air humidity in the environment and/or the ambient temperature, can be taken into consideration.

Alternatively or additionally, the setting of at least one of the at least one operating parameters can take place in a manner controlled by a field of characteristics. For this purpose, a field of characteristics, in which a dependence of the at least one operating parameter, in particular of the at least one optimum operating parameter, and at least one of the at least one carrier state variables, is represented, is stored and is used for setting the at least one operating parameter.

The heat engine can basically be any which is used in any desired application.

In particular, the heat engine concerns an internal combustion engine which discharges waste gas as carrier fluid.

The heat engine is used here in particular in a motor vehicle.

It shall be understood that in addition to the method for utilizing the waste heat of the heat engine, the corresponding heat recovery system is also included in the scope of this invention.

The heat recovery system has here, in addition to the heat engine, the cyclic process with the circuit and the evaporator. The heat recovery system has, in addition, a channel which discharges the carrier fluid from the heat engine and hereinafter is also designated as carrier fluid channel. Expediently, the carrier fluid channel runs to the evaporator. The heat recovery system can have in addition a determining device for determining at least one of the at least one carrier state variables. The heat recovery system has in addition a control device, which is configured in such a way that it drives the heat recovery system accordingly.

The determining device can have at least one measuring device, in particular at least one sensor, for determining at least one of the at least one state variables.

Alternatively or additionally, the determining device can have a computing unit, for example a processor, for determining at least one of the at least one carrier state variables, for example using the model and/or the field of characteristics.

The heat recovery system, in particular the determining device and/or computing unit, has advantageously a data memory on which for at least one carrier state variable at the evaporator at least one predetermined and optimum operating parameter of the cyclic process is stored. In particular for at least one carrier state variable one such optimum operating parameter is stored, which leads to a maximizing of the overall efficiency of the cyclic process. The control device is configured here in such a way that in operation it sets at least one of the operating parameters to the optimum operating parameter associated with the determined carrier state variable.

Alternatively or additionally, it is conceivable to store on the data memory the model and/or the field of characteristics, and to configure the control device and/or the determining device in such a way that they take into consideration the model and/or the field of characteristics in the setting of at least one operating parameter and/or in the determining of at least one of the carrier state variables at the evaporator.

The heat recovery system can have the aftertreatment device for the aftertreatment of the carrier fluid, which is flowed through by the carrier fluid in operation. In particular, the carrier fluid channel leads through the aftertreatment device.

The heat recovery system can have the turbocharger for compressing the fluid which is to be fed to the heat engine. The turbocharger can have a turbine wheel, which in operation is driven by the carrier fluid.

The heat recovery system here is in particular a component of a motor vehicle in which the heat engine can be configured as an internal combustion engine.

Further important features and advantages of the invention will emerge from the subclaims, from the drawing and from the associated FIGURE description with the aid of the drawings.

It shall be understood that the features mentioned above and to be explained further below are able to be used not only in the respectively indicated combination, but also in other combinations or in isolation, without departing from the scope of the present invention.

A preferred example embodiment of the invention is illustrated in the drawing and is explained in further detail in the following description, wherein the same reference numbers refer to identical or similar or functionally identical components.

BRIEF DESCRIPTION OF THE DRAWINGS

The FIGURE shows a highly simplified illustration in the manner of a circuit diagram of a heat recovery system for the utilization of waste heat of a heat engine.

DETAILED DESCRIPTION

A heat recovery system 1 for the utilization of the waste heat of a heat engine 2, as is shown for example in the FIGURE, comprises in addition to the heat engine 2 a cyclic process 3. The heat engine 2 can be, for example, an internal combustion engine 4. The cyclic process 3 can be for example a Rankine cyclic process 5. The heat recovery system 1 is, for example, a component of a motor vehicle 6, in which the heat engine 2 can serve for the drive. In operation, the heat engine 2 generates a hot carrier fluid which is discharged via a discharge system 7, wherein in the FIGURE only one channel 8 of the discharge system 7, hereinafter also designated as carrier fluid channel 8, is illustrated. If the heat engine 2 is an internal combustion engine 4, the discharge system 7 is therefore an exhaust gas system 9 and the carrier fluid channel 8 is an exhaust gas channel 10. The heat recovery system 1 which is shown has furthermore a feed system 11 for feeding a fluid, required for the operation of the heat engine 2, to the heat engine 2, wherein in the FIGURE only one feed channel 12 of the feed system 11 is shown. If the heat engine 2 is an internal combustion engine 4, the feed system 11 is a fresh air system 13 for the feeding of air to the internal combustion engine 4 and the feed channel 12 is a fresh air channel 14.

The cyclic process 3 has a circuit 15 in which, in operation, a working fluid circulates. The heat recovery system 1 has an evaporator 16, which transfers heat from the carrier fluid to the working fluid and vaporizes the working fluid in the circuit 15. In the example which is shown, the evaporator 16 is flowed through by the carrier fluid and, fluidically separated from the carrier fluid, is flowed through by the working fluid. The evaporator 16 is integrated here in the circuit 15 and in the discharge system 7, in particular in the discharge channel 8. The cyclic process 3 comprises furthermore downstream of the evaporator 16 an expansion engine 17 for expanding the working fluid, downstream of the expansion engine 17 a condenser 18 for condensing the working fluid, and downstream of the condenser 18 and upstream of the evaporator 16 a conveying device 19, in particular a pump 20, for conveying the working fluid through the circuit 15. As can be seen from the FIGURE, the condenser 18 can be cooled in operation, in order to condense the working fluid. For this purpose, in the example which is shown a cooler 21 is associated with the condenser 18, which cooler cools the condenser 18 with an air flow 22 which is indicated by an arrow in the FIGURE. In a variant which is not shown, the condenser 18 can be integrated for this purpose in a cooling circuit, which is not shown, in this case therefore the cooler 21 is the cooling circuit which is not shown. Likewise, the condenser 18 can be one which condenses the working fluid without additional cooling. The conveying device 19 is driven for driving the working fluid through the circuit 5 by a drive 23, in particular an electric drive 23'. The heat which is transferred via the evaporator 16 from the carrier fluid to the working fluid can be tapped at the expansion engine 17, for example in the form of a torque at a shaft 24 of the expansion engine 17, and the waste heat of the heat engine 2 can thus be utilized. An electric current can be generated here with the expansion engine 17 and/or the motor vehicle 6 can be driven.

The heat recovery system 1 has furthermore a control device 25 which is connected in a communicating manner with the cooler 21 and with the conveying device 19, in particular with the drive 23, as indicated by dashed lines. The communicating connection is such that the control device 25 can interrogate and change the performance and thus the energy consumption of the condenser 18 and of the conveying device 19.

As illustrated in the FIGURE, the heat recovery system 1 can have, furthermore, a turbocharger 27 and/or an aftertreatment device 28 for the aftertreatment of the carrier fluid, for example for the reduction of harmful substances in the carrier fluid. In the example which is shown, the aftertreatment device 28 and the turbine wheel 29 are integrated purely by way of example respectively upstream of the evaporator 16 in the discharge system 7. The turbocharger 27 serves the purpose for example of compressing the fluid, in particular fresh air, which is to be fed to the heat engine 2. In the example which is shown, the turbocharger 27 has a turbine wheel 29 which is integrated and driven in the exhaust gas system 7, in particular in the carrier fluid channel 8. The turbine wheel 29 is drivingly connected with a compressor wheel 30, which is integrated in the feed system 11, in particular in the feed channel 12, and thus compresses the fluid.

For utilizing the waste heat of the heat engine 2, at least one state variable of the carrier fluid, in particular of the exhaust gas, is determined here at the evaporator 16 and at least one operating parameter of the heat recovery system 1 is set depending on the determined state variable at the evaporator 16. In particular, the setting of the operating parameters can take place without determining of an operating state of the heat engine 2. In particular, at least one operating parameter of the cyclic process 3, for example the pressure and/or the temperature of the working fluid in the cyclic process 3, can be set. Here, the pressure in the working fluid is set in particular via the conveying device 19 and the temperature in particular via the cooler 21 and therefore the condenser 18. Likewise, the mass flow of the carrier fluid can be set through the aftertreatment device 28 and/or through the turbine 27, in particular through the turbine wheel 29, as operating parameter. Preferably, the setting of the operating parameters takes place in such a way that an overall efficiency of the heat recovery system 1 is maximized. Here, in addition to the performance provided by the expansion engine 17, in particular the torque provided by the expansion engine 17, an energy consumption of the condenser 18, in particular of the cooler 21, and of the conveying device 19, is taken into consideration.

For setting the at least one operating parameter, a predetermination of optimum operating parameters advantageously takes place, which are associated with corresponding state variables of the carrier fluid at the evaporator 16, hereinafter also designated as carrier state variables. This predetermination is stored for example in a data memory 31 of the heat recovery system 1, wherein the data memory 31 in the FIGURE is, purely by way of example, a component of the control device 25.

For determining at least one of the at least one carrier state variables of the carrier fluid at the evaporator 16 in operation a determining device 32 can be used, which for this purpose can have at least one measuring device 33, for example a sensor 34. As carrier state variables, preferably the temperature and the pressure of the carrier fluid at the evaporator 16 are used. Accordingly, the measuring device 33 at the carrier 16 can determine the temperature and/or the pressure of the carrier fluid. Consequently, the respective sensor 34 can be a temperature sensor 35 or respectively a pressure sensor 36. The sensor 34 is arranged in particular downstream of the evaporator 16. It is also conceivable to arrange such a measuring device 33 upstream of the evaporator 16. The at least one measuring device 33 is connected here expediently in a communicating manner with the control device 25. As further carrier state variable, the mass flow of the carrier fluid through the evaporator 16 can be taken into consideration.

Alternatively or additionally, the determining device 32 can determine at least one of the carrier state variables at the evaporator 16 in a manner based on a field of characteristics or on a model field. In this case, a direct determining or measuring of the corresponding at least one carrier state variable at the evaporator 16 is not necessary. Here, a field of characteristics and/or model, in dependence with the at least one carrier state variable, is stored in particular in the data memory 31. The model and/or the field of characteristics can represent here the dependence of the at least one carrier state variable on at least one state variable of the working fluid, hereinafter also designated as working state variable. Here, in particular a temperature of the working fluid and/or a pressure in the working fluid are taken into consideration. For this purpose, the determining device 32 can have a measuring device 33, for example a sensor 34, in particular a temperature sensor 35 and/or a pressure sensor 36, which determines the temperature and/or the pressure of the working fluid, wherein the measuring device 33 is connected expediently with the control device 25 in a communicating manner. Furthermore, the determining device 32 has for this purpose a computing unit 37, which determines at least one carrier state variable at the evaporator 16 from the at least one determined working state variable. Here, the determining device 32 and the computing unit 37, in the example which is shown and purely by way of example, are components of the control device 25.

In the respective field of characteristics and/or model furthermore a flow section of the carrier fluid to the evaporator 16, in particular from the heat engine 2 to the evaporator 16, are taken into consideration. It is furthermore preferred if in the field of characteristics and/or in the model further, thermodynamically relevant parameters are taken into consideration. These include in particular thermal inertias of the aftertreatment device 28 and/or of the turbocharger 27, in particular of the turbine wheel 29. Belonging hereto in addition are preferably heat transfer coefficients of the components integrated in particular upstream of the evaporator 16 in the discharge system 7, therefore in particular of the aftertreatment device 28 and/or of the turbocharger 27. In addition, the field of characteristics and/or the model can take into consideration the temperature of the carrier fluid at the turbocharger 27, in particular at the turbine wheel 29 and/or at the aftertreatment device 28. It is likewise conceivable to take into consideration in the field of characteristics and/or in the model the mass flow of the carrier fluid through the turbocharger 27, in particular through the turbine wheel 29, and/or through the aftertreatment device 28.

Furthermore, it is advantageous if in the field of characteristics and/or in the model thermodynamic parameters of the environment, in particular exterior state variables, for example the ambient temperature and/or the air humidity in the environment and suchlike, are taken into consideration. If the heat recovery system 1 is a component of a motor vehicle 6, in the model and/or in the field of characteristics furthermore the speed of the vehicle 6 can be taken into consideration and thus represented.

The determining of the at least one carrier state variable in a manner based on field of characteristics and/or model, allows the use of separate measuring devices 33 at the evaporator 16 to be dispensed with.

The invention claimed is:

1. A method for operating a heat recovery system for the utilization of waste heat of a heat engine of the heat recovery system, comprising:
    discharging a carrier fluid via the heat engine;
    feeding the carrier fluid to an evaporator of a cyclic process of the heat recovery system;
    vaporizing, via the evaporator and the waste heat, a working fluid of the cyclic process;
    feeding the working fluid to an expansion engine of the cyclic process after vaporizing the working fluid;
    determining at least one carrier state variable of the carrier fluid at the evaporator;
    setting at least one operating parameter of a plurality of operating parameters of the heat recovery system based on the at least one determined carrier state variable; and
    wherein the at least one carrier state variable is determined based on at least one of (i) at least one working state variable of the working fluid and (ii) at least one of the plurality of operating parameters of the heat recovery system.

2. The method according to claim 1, wherein the at least one carrier state variable includes at least one of:
    a temperature of the carrier fluid at the evaporator;
    a pressure in the carrier fluid at the evaporator; and
    a mass flow of the carrier fluid through the evaporator.

3. The method according to claim 1, further comprising storing a model that represents a dependence of the at least one carrier state variable on at least one of (i) a flow section of the carrier fluid, (ii) at least one working state variable of the working fluid, and (iii) the at least one operating parameter of the heat recovery system; and
    wherein determining the at least one carrier state variable includes considering the model.

4. The method according to claim 1, wherein:
    the at least one carrier state variable is determined based on an amount of heat in the evaporator; and
    determining the at least one carrier state variable includes determining the amount of heat in the evaporator based on a temperature of the working fluid and a pressure of the working fluid.

5. The method according to claim 1, wherein the at least one operating parameter is set such that the heat engine provides a predetermined output.

6. The method according to claim 1, wherein:
    the at least one operating parameter that is set based on the at least one determined carrier state variable includes at least one of (i) a performance of a condenser of the cyclic process and (ii) a performance of a conveying device conveying the working fluid in the cyclic process; and
    the at least one of the plurality of operating parameters from which the at least one carrier state variable is determined includes at least one of (i) a temperature of the working fluid and (ii) a pressure of the working fluid.

7. The method according to claim 1, wherein:
the at least one operating parameter that is set based on the at least one determined carrier state variable includes at least one of (i) a temperature of the working fluid and (ii) a pressure of the working fluid; and
the at least one of the plurality of operating parameters from which the at least one carrier state variable is determined includes at least one of:
a thermal inertia of a turbocharger;
a heat transfer coefficient of the turbocharger;
a temperature of the carrier fluid at the turbocharger;
a mass flow of the carrier fluid through the turbocharger;
a thermal inertia of an aftertreatment mechanism;
a heat transfer coefficient of the aftertreatment mechanism;
a temperature of the carrier fluid at the aftertreatment mechanism; and
a mass flow of the carrier fluid through the aftertreatment mechanism.

8. The method according to claim 1, wherein setting the at least one operating parameter based on the at least one determined carrier state variable is performed without determining an operating state of the heat engine.

9. The method according to claim 1, further comprising determining and saving an optimum setting for the at least one operating parameter for the at least one carrier state variable; and
wherein setting the at least one operating parameter includes setting the at least one operating parameter to the saved optimum setting for the at least one determined carrier state variable.

10. The method according to claim 9, wherein determining and saving the optimum setting includes maximizing an overall efficiency of the heat recovery system.

11. The method according to claim 10, wherein maximizing the overall efficiency of the heat recovery system includes considering an energy consumption of a conveying device conveying the working fluid in the cyclic process.

12. The method according to claim 10, wherein maximizing the overall efficiency of the heat recovery system includes considering an energy consumption of a condenser of the cyclic process.

13. The method according to claim 10, wherein maximizing the overall efficiency of the heat recovery system includes considering an efficiency of the expansion engine.

14. The method according to claim 1, further comprising storing a model that represents a dependence of the at least one carrier state variable on a flow section of the carrier fluid, at least one working state variable of the working fluid, and the at least one operating parameter of the heat recovery system; and
wherein the at least one carrier state variable is determined based on the model.

15. The method according to claim 14, wherein the flow section of the carrier fluid is disposed between the heat engine and the evaporator.

16. The method according to claim 14, further comprising determining a mass flow of the carrier fluid through the evaporator based on the model and a drop in pressure of the carrier fluid at the evaporator.

17. The method according to claim 16, further comprising:
determining an upstream pressure of the carrier fluid upstream of the evaporator;
determining a downstream pressure of the carrier fluid downstream of the evaporator; and
determining the drop in pressure of the carrier fluid at the evaporator based on the upstream pressure and the downstream pressure.

18. A heat recovery system for utilization of waste heat, comprising:
a heat engine which discharges a carrier fluid during operation;
a carrier fluid channel via which the carrier fluid is discharged from the heat engine;
a cyclic process having a circuit in which a working fluid circulates during operation;
an evaporator structured and arranged to transfer heat from the carrier fluid to the working fluid;
an expansion engine integrated in the circuit and configured to utilize energy of the working fluid;
a measuring device configured to measure at least one working state variable of the working fluid at the evaporator;
a determining device configured to determine at least one carrier state variable of the carrier fluid at the evaporator based on the at least one working state variable measured via the measuring device; and
a control device configured to operate the heat engine to discharge the carrier fluid to the evaporator, operate the evaporator to vaporize the working fluid using waste heat from the heat engine and to feed the vaporized working fluid to the expansion engine, operate the determining device to determine the at least one carrier state variable, and set at least one operating parameter based on the at least one carrier state variable.

19. The heat recovery system according to claim 18, further comprising a data memory on which at least one predetermined and optimum operating parameter associated with the at least one carrier state variable is stored; and
wherein the control device is further configured to set the at least one operating parameter to the optimum operating parameter associated with the at least one carrier state variable.

20. A method for operating a heat recovery system for the utilization of waste heat of a heat engine of the heat recovery system, comprising:
discharging a carrier fluid via the heat engine;
feeding the carrier fluid to an evaporator of a cyclic process of the heat recovery system;
vaporizing, via the evaporator and the waste heat, a working fluid of the cyclic process;
feeding the working fluid to an expansion engine of the cyclic process after vaporizing the working fluid;
determining at least one carrier state variable of the carrier fluid at the evaporator;
setting at least one operating parameter of the heat recovery system based on the at least one determined carrier state variable; and
wherein the at least one carrier state variable includes a pressure in the carrier fluid at the evaporator.

* * * * *